July 8, 1924.
R. W. WALES
STORAGE BATTERY
Filed May 5, 1921
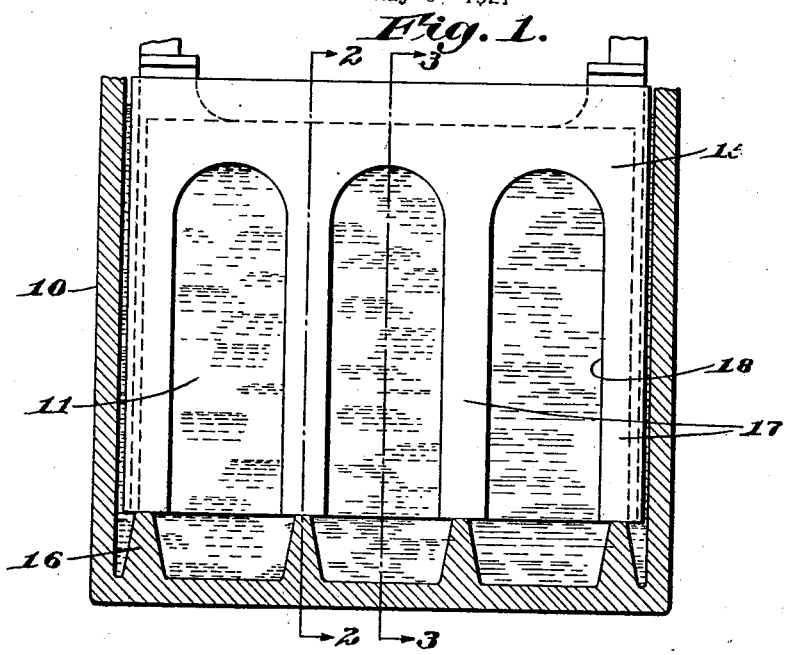
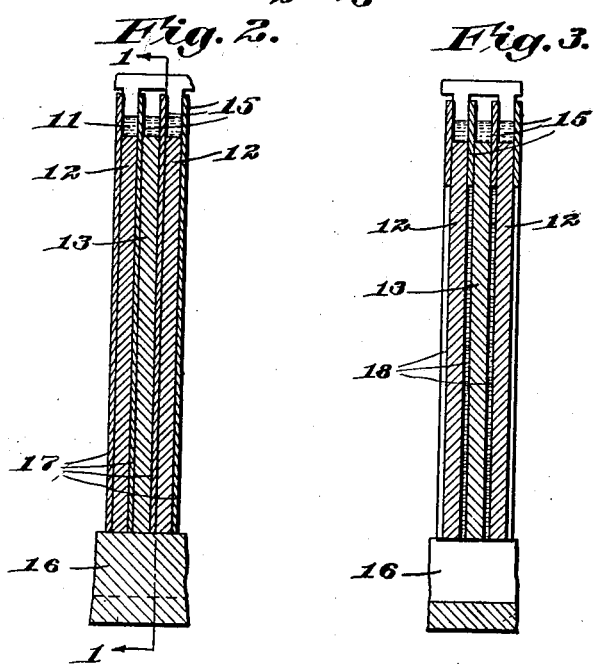
Inventor
Ralph W. Wales
by Mitchell, Chadwick & Kent
Attorneys Patented July 8, 1924.

1,500,287

UNITED STATES PATENT OFFICE.

RALPH W. WALES, OF AUBURNDALE, MASSACHUSETTS.

STORAGE BATTERY.

Application filed May 5, 1921. Serial No. 467,006.

*To all whom it may concern:*

Be it known that I, RALPH W. WALES, a citizen of the United States, residing at Auburndale, in the county of Middlesex and State of Massachusetts, have invented certain new and useful Improvements in Storage Batteries, of which the following is a specification.

This invention relates to improvements in storage batteries. More particularly it relates to separators therein. It is an object of the invention to provide an improved device for keeping the positive and negative plates of storage batteries safely apart, so as to prevent the buckling of plates to any harmful degree, and short circuiting, while at the same time having the plates set extremely near together, and providing for improved freedom of passage of the electrolyte between them. Other objects are to prevent the occurrence of short circuits by the dropping of any metallic substance across the tops of the plates, or by the falling of any of the paste from the body of the plates in such manner as to make a bridge across to the next adjacent plate. These objects are accomplished by providing a separator of sheet material, which may be non-porous, having relatively large open spaces through the area of the plate, through which there may be perfectly free circulation of the liquid, both in mass and in that very minute aspect which characterizes electrolytic action; and by providing said openings so that they extend down vertically, or approximately so, to below the level of the active plates and constitute chutes by which any of the filling material of the plate which may fall out shall be guided down through the electrolyte to a place where it is harmless, below the active plates. To this end the side walls of the said openings are free from upwardly facing surfaces at all levels where they are between active plates. The separator plates themselves moreover rise above the level of the tops of the active plates, and by their own tops constitute a protective screen, which screen has a slotted opening, as it were, where each plate is; but in which the separators are so close together as to prevent any instrument which falls upon the top from descending far enough to make contact with the plates, or at any rate to prevent it from making contact with more than one plate.

An illustrative embodiment of the invention is shown in the description which follows, but it will be understood that variations may be made within the scope of the invention. It is intended that the patent shall cover by suitable expression in the appended claims whatever features of patentable novelty exist in the invention disclosed.

In the accompanying drawings;

Figure 1 is an elevation partly in section, of a storage battery cell taken on a plane parallel with the plates, on line 1—1 of Figure 2, showing one form of separator constructed in accordance with the present invention:

Figure 2 is an elevation of a portion of the cell in section on line 2—2 of Figure 1; and Figure 3 is a view similar to Figure 2, in section on line 3—3 of Figure 1.

Referring to the drawings, 10 indicates the walls and 11 the electrolyte liquid in a storage battery cell of any ordinary or suitable type, wherein there are active plates 12 and 13 of opposite polarity. In such a battery it is ordinarily desirable that the active plates of opposite polarity be located as close together as is possible, in order that a large number of plates may be gotten into a cell of certain size, because the capacity of the cell depends upon the quantity of active material contained within it, and its rate in action depends on the area of exposed surfaces of active material. By setting plates closer together, quantity and area are increased; but the danger of a short circuit resulting either from buckling or from bridging across by material is also increased, so that it has in consequence become common to make separators of continuous sheets, and to make them of porous material notwithstanding that the circulation is less free through such separators, with resulting slowness of action of the battery. In the embodiment of the invention illustrated in the drawings, separator plates 15 are provided which under operative conditions may conveniently be about one-sixteenth of an inch in thickness, and which are made of acid-resisting, insulating material, which may if preferred be impervious to liquids. Such plates may have the general form which is seen in Figure 1 where the full face of one of the plates is shown in full lines, and where the outline of the active plates of the storage battery is seen, for the most part in dotted lines. Sills or ridges 16 are arranged in the bottom of the cell, athwart which the bottom edges of the active plates 12 and 13 stand. The separators 15 stand on the same sills, but the parts of the separators which stand on these sills are mere legs 17, one leg to each sill. The said legs constitute those portions of the separator plate which remain after the excision of considerable sections thereof to make the openings 18. These openings are closed at the top, where a bridge-like portion of the separator plate joins the tops of all of the legs 17 of the particular plate, and rises above the level of the tops of the active plates, as is seen by the comparison of level of the full and dotted horizontal lines in the upper part of Figure 1. The walls of each opening 18 are so designed that they do not converge downward. As illustrated, they are parallel for the greater part of the height of the active plates; but, if preferred, the two walls of any opening 18 might be divergent downward, the purpose being to afford no ledge on which any material can rest, which may fall into one of these openings from an adjacent active plate, so that such material will fall immediately to the very bottom. It will be noted moreover that the tops of the sills 16 are smaller than the bottoms of the legs 17, and that although these sills have side surfaces which are inclined, with the sides of each sill converging upward, so that the walls of the space between two adjacent sills converge downward, nevertheless the pitch is so steep that no material could lodge thereon; but material would fall to the very bottom. Accumulations of material falling from the active plates may thus be piled up in the space below those plates, and under the openings 18, without occasioning short circuiting of the plates.

The separators 15, being approximately no further apart than is required to admit one active plate between each pair of separators, making a loose fit so as to allow access of the electrolyte to the entire surface of each active plate, make in effect a screen floor at a level one-half inch or so above the general level of the tops of the cell, thus preventing anything on top from bridging across from one active plate to another.

I claim as my invention:

1. A storage battery comprising, in combination with the active plates and the electrolyte thereof; separators, made of insulating material arranged between the active plates, and having openings extending up and down, with lateral surfaces of said openings so steeply inclined as to shed downward any solid substance falling thereon; there being at the bottom a space below said opening into which material shed therefrom may fall; and the horizontal and vertical boundaries of said openings in each separator being integral with each other, whereby the entire thickness of stock is used in their junction.

2. A storage battery comprising, in combination with the active plates and the electrolyte thereof; separators, made of insulating material arranged between the active plates, each comprising a high horizontal portion at the level of the tops of the plates, and vertical legs supporting said horizontal portion from a level as low as the bottoms of said plates; the spaces between said legs at intermediate levels being free for material to fall; and the legs and horizontal portion being of uniform thickness.

3. A storage battery comprising, in combination with the active plates and the electrolyte thereof; separators, made of insulating material arranged between the active plates, each comprising a high horizontal portion extending above the level of the tops of the plates and constituting a support there for articles that may fall thereon; and vertical legs supporting said horizontal portion from a level as low as the bottoms of said plates; the spaces between said legs at intermediate levels being free for material to fall; said horizontal portion above the plates having the full thickness of said legs.

4. A storage battery comprising, in combination with the active plates and the electrolyte thereof; separators, made of insulating material arranged between the active plates, each having a top portion, lying between and extending above the upper ends of the plates, from which portion a plurality of legs of uniform width therewith extend downward between the plates, the space between the legs constituting passages for solid particles discharged from the plates to below the bottoms thereof; and there being space below said bottoms into which the discharge may be deposited.

5. A storage battery comprising, in combination with the active plates and the electrolyte thereof; separators, made of insulating material arranged between the active plates, and in close proximity thereto, and having openings with walls extending continuously vertically as far down as the active plates extend; said separators being of thin material uniform in thickness, and the tops of the openings being of diminished width, and the width of material between them of increased width, as compared with the said openings and material at lower levels.

Signed at Auburndale, Massachusetts, this second day of May, 1921.

RALPH W. WALES.